United States Patent [19]

Voss

[11] Patent Number: 5,366,292
[45] Date of Patent: Nov. 22, 1994

[54] SENSOR FORMED FROM A DEFORMATION HEAT RECOVERABLE MATERIAL HAVING A PREDETERMINED RANGE OF TEMPERATURES IN WHICH RECOVERY OCCURS AND USED FOR MEASURING A PHYSICAL CHARACTERISTIC OF A SYSTEM

[75] Inventor: Guenter Voss, Much, Germany
[73] Assignee: Leybold AG
[21] Appl. No.: 473,588
[22] Filed: Feb. 1, 1990

[30] Foreign Application Priority Data

Feb. 1, 1989 [EP] European Pat. Off. ........ 89101676.8
Jan. 11, 1990 [EP] European Pat. Off. ........ 90100477.0

[51] Int. Cl.⁵ .......................... G01K 5/48; G01K 5/62; G01K 5/72; G01N 25/00
[52] U.S. Cl. .................................... 374/188; 116/216; 374/205; 374/45
[58] Field of Search ............... 374/187, 188, 159, 205, 374/45; 116/219, 221, 216

[56] References Cited

U.S. PATENT DOCUMENTS

| | | | |
|---|---|---|---|
| 3,217,538 | 11/1965 | Loeb | 374/29 |
| 3,256,734 | 6/1966 | Storke, Jr. | 374/29 |
| 3,440,997 | 4/1969 | Rogen et al. | 116/216 |
| 3,483,748 | 12/1969 | Rogen et al. | 374/159 |
| 3,905,228 | 9/1975 | Smith | 374/29 |
| 4,125,012 | 11/1978 | Madsen | 374/45 |
| 4,443,119 | 4/1984 | Snider, Jr. et al. | 374/153 |
| 4,498,337 | 2/1985 | Gruner | 374/185 |
| 4,579,006 | 4/1986 | Hosoda et al. | 374/142 |
| 4,636,089 | 1/1987 | Schumann | 374/43 |
| 4,707,148 | 11/1987 | Richmond | 374/205 |
| 4,722,610 | 2/1988 | Levert et al. | 374/43 |

FOREIGN PATENT DOCUMENTS

0223535 9/1988 Japan ..................... 374/208

*Primary Examiner*—Diego F. F. Gutierrez
*Attorney, Agent, or Firm*—Hill, Steadman & Simpson

[57] ABSTRACT

For use in a measuring and analysis instrument, a sensor including a sensor element responsive to changes in a quantity to be measured by the instrument. The sensor element is formed from a deformation heat-recoverable material having a predetermined range of temperatures in which recovery occurs. The sensor may include a control mechanism for maintaining the temperature of the sensor element substantially within the predetermined range. The sensor element forms a part of a circuit including a power source, and the control mechanism may include apparatus for selectively heating the sensor element. The sensor element is operatively connected to a signal device for sensing a physical characteristic of the sensor element and generating signals corresponding to the characteristic sensed. The signal device may include a temperature sensor, a force sensor, or a light sensor. A volt meter or ammeter may be used to measure the level of electrical energy required to maintain the sensor element at a constant temperature, thus serving as an analogue for measuring the temperature directly.

20 Claims, 2 Drawing Sheets

SENSOR FORMED FROM A DEFORMATION HEAT RECOVERABLE MATERIAL HAVING A PREDETERMINED RANGE OF TEMPERATURES IN WHICH RECOVERY OCCURS AND USED FOR MEASURING A PHYSICAL CHARACTERISTIC OF A SYSTEM

TECHNICAL FIELD

The invention is directed to a sensor for measuring or analysis instruments, with the sensor including a sensor element formed from a material that is either directly or indirectly influenced by the physical quantity to be measured or analyzed.

BACKGROUND OF THE INVENTION

An example of a measuring instrument wherein the quantity to be measured exercises direct influence on the condition of the material of the sensor element is the resistance thermometer. In such instruments, the sensor element is traversed by a current. The amount of current flowing through the sensor element is directly dependent upon the ambient temperature of the sensor element, and can thus be used as an analogue for the temperature to be measured. Thus, in this measuring instrument, the measured quantity has a direct influence on the thermic condition of the material of the sensor element.

By contrast, the thermal conduction vacuum meter, commonly known as a Pirani gauge, is an example of a measuring instrument wherein the quantity to be measured exercises indirect influence on the condition of the material of the sensor element. In this instrument, the relationship between the pressure of a gas and its thermal conductivity is exploited for measuring pressure. A current traversed sensor element emits more heat when subject to higher pressures. The level of flowing current is dependent on the thermic condition of the sensor element, so that this condition can be employed as a measure for the pressure. In a measuring instrument of this type, the measured quantity (i.e., pressure or vacuum) has an indirect influence on the thermic condition of the sensor element.

The above described sensors are relatively technologically complex. In particular, thermal conduction vacuum meters have a limited sensitivity, and thus a limited range of measurement, at high and extremely low pressures.

It is also known to use sensor elements that are composed of a deformation heat-recoverable material for observing temperature. Materials of this type are known from "Legierungn mit Formgedaechtnis" Dieter Stoeckel, Expert Verlag, 1988. This text describes alloys whose atoms have different crystalline structures at different temperatures, more specifically an Austenite structure at higher temperatures (at a high-temperature phase) and a Martensite structure at lower temperatures (a low-temperature phase). Materials of this type "remember" a form impressed in the high-temperature phase. When these materials are deformed in a low-temperature phase, and then subsequently brought into a high-temperature phase by heating, they re-assume their original form that was impressed in the high-temperature phase. The change in shape or "recovery" begins at what is referred to as the $A_s$-temperature, i.e., a temperature at which the structural transition from low-temperature phase into high-temperature phase begins. The overall recovery occurs within a relatively small temperature range, for example 10 to 20 K. Dependent upon the specific alloy, the $A_s$-temperature can lie between $-150°$ and $+150°$ C.

Objects formed from deformation heat-recoverable materials thus have the property that a deformation (bending, torsion, dilatation, or compression) carried out at low-temperatures (below the $A_s$-temperature) is "undone" when the object is heated to reach a high-temperature phase. For example, a wire composed of the material Nitinol stretched at low-temperatures shortens by about 3 to 5% upon transition from the low-temperature phase into the high-temperature phase. This change in length is not only directly opposite the "normal" thermic change in length, but is also greater by a multiple.

As a result of the relatively small temperature range in which recovery occurs, deformation heat-recoverable materials have heretofore been employed in temperature measuring devices only to an extremely limited degree. They are therefore used as temperature "detectors", and essentially serve a temperature monitoring function. Their job is to generate a signal when a defined temperature is upwardly or downwardly exceeded (see Patent Abstracts of Japan, Vol. 8, No. 259, JP-A-59-131 130, U.S. Pat. No. 3,483,748, and French Patent No. 22 85 601).

SUMMARY OF THE INVENTION

It is therefore an object of the present invention to provide a sensor for measuring or analysis instruments that is structurally simple, and furthermore effective over a large range of measurements.

This and other objects are achieved by providing, in a measuring instrument, a sensor including a sensor element that is either directly or indirectly responsive to changes in a quantity to be measured by the instrument. The sensor element is formed from a deformation heat recoverable material having a predetermined range of temperatures in which recovery occurs. The sensor may also include apparatus for maintaining the temperature of the sensor element substantially within the predetermined temperature range.

The sensor element may be operatively connected to a signal device which senses a physical characteristic (e.g., temperature) of the sensor element, and generates signals corresponding to the physical characteristic.

The invention also includes a method of sensing a physical characteristic of a system within a predetermined range of values. The method involves first providing a sensor having a sensor element formed of a deformation heat-recoverable material. The material is selected such that it has a predetermined range of temperatures in which recovery occurs, wherein the predetermined range of temperatures corresponds to the predetermined range of values to be sensed.

A sensor element composed of deformation heat-recoverable material is heatable such that its operating temperature can be set to a temperature in the region of structural phase transition of the material. As a result, the quantity to be measured exerts an influence on the crystalline condition of the material of the sensor element. This influence is exerted either directly, as is in the case with temperature, or indirectly, as is the case with density, pressure, thermal conduction, type of gas, etc. The energy required to achieve an effective change in the crystalline condition of the material is slight, so that the sensor element of the present invention is extraordinarily sensitive. It is therefore particularly suitable for measured quantities that have an indirect influence on the crystalline condition of the material of the sensor element. It is thus possible with the present invention to provide measuring instruments having large ranges of measurement for such quantities.

Since the sensor of the present invention is extremely sensitive, it is particularly advantageous to maintain the temperature of the sensor element constant during operation of the sensor, so that it lies at a range in which the extent of recovery of the sensor element is maximized.

In an exemplary embodiment of the present invention, the temperature of the sensor element is held constant by passing electrical energy through the sensor element. The amount of electrical energy required to maintain the element at a constant temperature is therefore used to represent the quantity to be measured. A sensor of this type is simple, compact, exact, sensitive, and fast to react.

Other objects and advantages of the present invention will become apparent upon reference of the accompanying description when taken in conjunction with the following drawings.

DETAILED DESCRIPTION OF THE PREFERRED EMBODIMENTS

Figure 1:
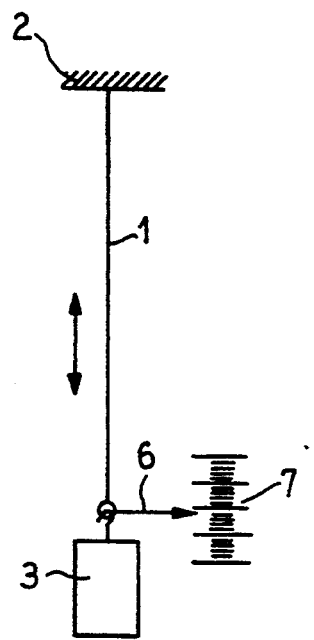
FIGS. 1 and 2 are schematic diagrams of sensors having wire-form sensor elements.
Figure 2:
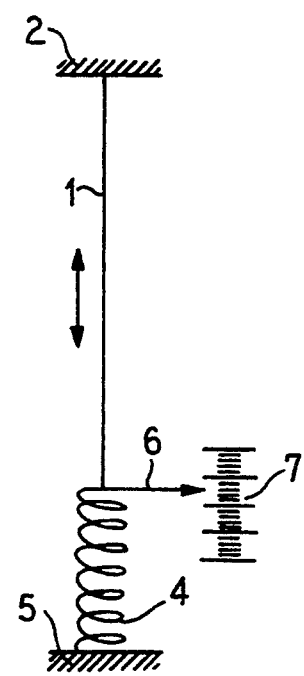

FIGS. 1 and 2 each show a sensor which includes a wire section 1 of deformation heat-recoverable material, for example Nitinol. In a preferred embodiment, the wire section 1 can have a length of approximately 10 cm and a diameter of approximately 1 mm. The wire section 1 has its upper end suspended at a fixed point 2. A constant tension is maintained in the wire section 1 either by providing a weight 3 as shown in FIG. 1, or by being attached to one end of a spring 4, the other end of which is attached to a stationary point 5, as shown in FIG. 2. One advantage of using a weight 3 as shown in FIG. 1 is that the load is independent of expansion of the wire section 1. However, the sensor of the FIG. 1 embodiment must be maintained at a constant attitude.

By comparison, the sensor FIG. 2 is independent of attitude. However, in this embodiment the tensile stress generated by the spring 4 changes with variation of the length of the wire section 1.

In the above described embodiments, the deformation heat-recoverable material from which the sensor element is formed should be selected such that it has a predetermined range of temperatures in which recovery occurs that corresponds to the range of values to be detected by the sensor. Thus, the change in length or shape of the sensor element corresponds directly to a change in the quantity to be measured, in these examples temperature. When, for example, the range of temperatures in which recovery occurs is approximately 20° through 30° C., then a temperature change within this range effects a relatively great length or shape change of the sensor element, shown as wire section 1. Such change can be identified with the assistance of a pointer 6 and a measuring scale 7 secured to the free end of the wire section 1. One should note, however, that the measurement ranges of the sensors of FIGS. 1 and 2 are relatively small.

Figure 4:
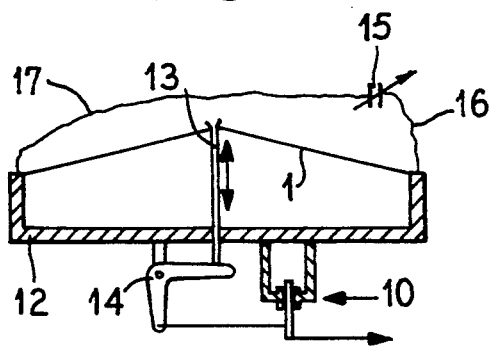
FIG. 4 is a part sectional schematic diagram of a sensor wherein motion is transmitted onto a pointer instrument.

A wire section 1 is again provided in the sensor of FIG. 4. The ends of the wire section 1 are secured to a carrier member 12. A pin 13 is provided on the center of the wire section 1, and is laterally displaceable thereto. The pin 13 is supported on a bent lever 14, in an arrangement common in capsule vacuum meters. The bent lever 14 is used to actuate an indicator system 10. A change in length of the wire section 1 in response to a temperature change causes corresponding movement in a pointer (not shown) in the indicator system 10.

Figure 3:
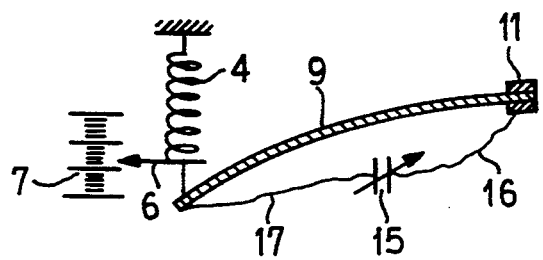
FIG. 3 is a part sectional schematic diagram of a sensor employing an arcuate sensor element.

The sensor element should have an operating temperature that lies in the temperature range wherein recovery of the deformation heat recoverable material occurs. When the sensor element is provided as a wire section, such recovery occurs as a length change. However, FIG. 3 shows a sensor element formed as an arcuate member 9. The arcuate member defines a predetermined degree of curvature, and recovery of the deformation heat recoverable material affects a change in the degree of curvature.

Figure 5:
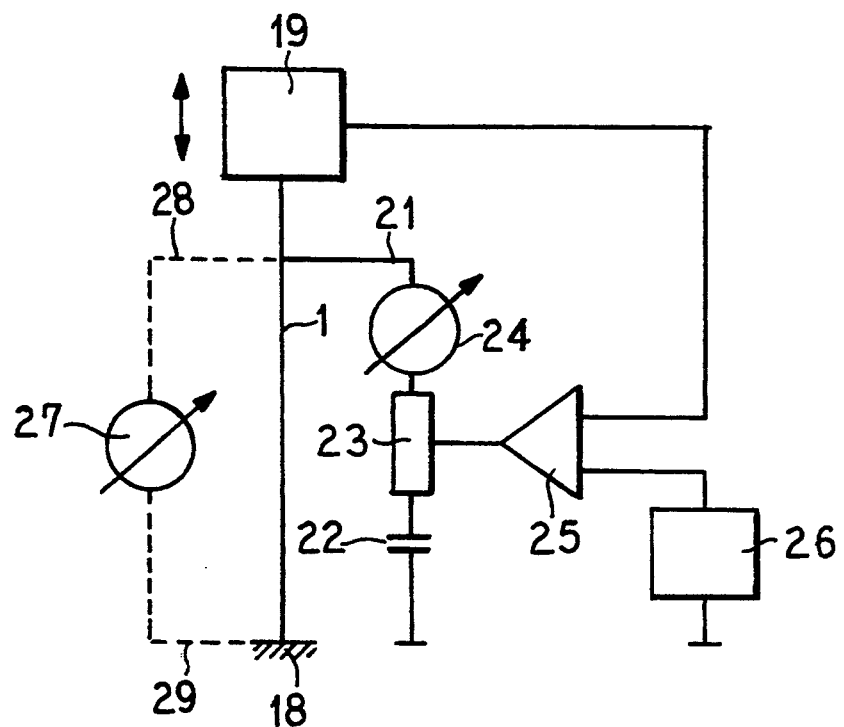
FIG. 5 is a schematic diagram representing a sensor including controlled heating apparatus.

In the exemplary embodiments of FIGS. 3 through 5, the temperature of respective sensor elements is maintained in the range in which recovery of the deformation heat recoverable material occurs. In the sensors of FIGS. 3 and 4, for example, a controllable power source 15 is shown that is connected via lines 16 and 17 to the ends of the sensor element. The strength of the current is to be set such that the wire section 1 or the arcuate member 9 are maintained at a predetermined temperature. As a consequence, the measuring range of the sensor can be drastically increased, since it is no longer the physical change occurring as a result of recovery that is used as a basis for measurement, but rather the current flowing through the sensor element.

In the exemplary embodiment of FIG. 5, the wire section 1 is disposed between a fixed point 18 and a control element 19. The wire section 1 is inserted into an electrical circuit 21 that includes a power source 22, a variable resistance 23, and an ammeter 24. The wire section 1 is simultaneously grounded in the region of the fastening point 18.

The purpose of the illustrated circuit 21 is to maintain the temperature, and thus the crystalline condition, of the wire section 1 constant, independently of the ambient temperature. The constant temperature value preferably lies within the temperature range in which recovery of the deformation heat recoverable material occurs. The control element 19 supplies electrical signals that are dependent on a physical property associated with the sensor element, for example the length of the sensor element, the temperature, or the tensile force exerted thereon. The signals are supplied to a comparator 25. The comparator also receives a comparison value from a rated value generator 26. The output of the comparator 25 is used to control the variable resistance 23 such that the physical properties associated with the wire section 1 are kept constant independent of the temperature influence of its ambient environment. As a result, the electrical energy flowing in the circuit 21 can be quantified with the assistance of the ammeter 24, and thus can serve as a measurement for changes in the ambient temperature.

Another measured quantity can be the voltage adjacent the wire section 1. A volt meter 27 may be connected to the ends of the wire section 1 via connecting lines 28 and 29.

The control element 19 can be a force sensor that supplies signals proportional to the force exerted on the wire section 1. At a predetermined temperature that corresponds to a predetermined condition of the wire section 1, the wire section 1 exerts a predetermined force F on the force sensor 19. This force may be kept constant by maintaining constant temperature of the wire section 1. When the condition of the wire section 1 changes as a consequence of a temperature change, then the force exerted on the wire section also changes. The signal supplied to the amplifier 25 then effect the boosting or lowering of the current in the circuit 21, such that the value of the force exerted by the wire section 1 is maintained constant. Variations in the levels of current or voltage are thus a measure of variations of ambient temperature acting on the wire section 1.

A similar control can also be optically achieved (for example, with the assistance of a light barrier that reacts to a length change of the wire section 1). Alternatively, control can be achieved by using a temperature measurement, for example with the assistance of a temperature sensor secured to the wire section 1. The control element 19 is shown schematically, and thus may represent a force sensor, a light sensor, or a temperature sensor.

Figure 6:
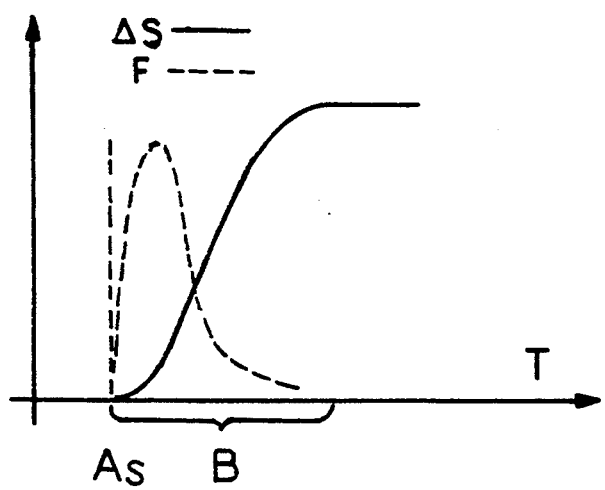
FIG. 6 is a graphic representation of physical properties of deformation heat recoverable material.

FIG. 6 is a graphic representation of the properties of deformation heat-recoverable materials of the type used in the present invention. A solid line is used to indicate path change, and a broken line is used to indicate force. Both quantities are plotted against temperature T along the x-axis. The range of temperature B in which the deformation heat-recoverable material changes shape due to recovery begins at a temperature $A_s$. In many materials of the type under discussion here, the temperature range B has an order of magnitude of about 20 K. The Martensite structure converts into the Austenite structure at the transition from the lower temperature to higher temperature. The resultant forces are greatest at the beginning of this crystalline conversion. When the temperature of the sensor element is maintained at a constant value lying within this range, for example in an upper sub-range of the rising edge of the force curve, an especially great sensitivity and precision in measurement result. It is to be understood that the temperature of the sensor element could alternatively be maintained at a constant value lying within a lower sub-range of the force curve. In either example, the temperature range includes a sub-range in which recovery of the sensor element is maximized, and the constant value lies within this sub-range.

The sensor of the present invention can be used in any measuring and analysis instrument wherein the measured quantity is related to temperature changes of the sensor element. In other words, whenever a physical property of the sensor element is directly dependent on an ambient physical characteristic, (e.g., ambient temperature) or is indirectly dependent on an ambient physical characteristic (e.g., density, pressure, thermal conduction, gas presence, or the number of particles present in the atmosphere directly surrounding the sensor element). Any such physical characteristics can therefore be measured using the sensor of the present invention.

The temperature of the sensor element may also be dependent upon radiation incident onto the sensor element, so that the sensor can be used for measuring the luminance of lamps and laser light sources. As a consequence of the dependency on the presence of a certain type of gas, conclusions about the type of molecules or atoms surrounding the sensor are possible.

Deformation heat-recoverable materials have been described hereinabove with reference to such materials expanding in a single dimension, in other words having a "one-way effect". Other deformation heat recoverable materials are known which change shape by both expanding and contracting. Such materials are said to have a "two-way effect". Either type of material may be used in sensors of the present invention. Sensor elements 1 and 9 provided with weight or springs, although illustrated as having only a one-way effect, behave similarly to materials having a two-way effect due to the load imposed by the weight 3 of the spring 4.

Although the present invention has been described with reference to a specific embodiment, those of skill in the art will recognize that changes may be made thereto without departing from the scope and spirit of the invention as set forth in the appended claims.

I claim as my invention:

1. In a measuring instrument, a sensor including a sensor element responsive to changes in a quantity to be measured by said instrument;

wherein said sensor element is formed from a deformation heat-recoverable material having a predetermined range of temperatures in which recovery occurs; and said sensor comprises control means for maintaining the temperature of said sensor element substantially within said predetermined range.

2. A sensor according to claim 1, wherein said sensor element forms a part of a circuit comprising a power source.

3. A sensor according to claim 2, wherein said control means comprises means for selectively heating said sensor element.

4. A sensor according to claim 3, wherein said sensor element is operatively connected to signal means for sensing a physical property of said sensor element and generating signals corresponding to said physical property.

5. A sensor according to claim 4, wherein said signal means comprises a temperature sensor.

6. A sensor according to claim 4, wherein said signal means comprises a force sensor.

7. A sensor according to claim 4, wherein said signal means comprises a voltmeter.

8. A sensor according to claim 4, wherein said signal means comprises an ammeter. .

9. A sensor according to claim 1, wherein said sensor element is formed from a two-way deformation heat-recoverable material.

10. A sensor according to claim 1, further wherein said sensor element comprises a deformation heat-recoverable wire segment, the recovery of which occurs longitudinally of said wire segment.

11. A sensor according to claim 1, further wherein said sensor element comprises a deformation heat-recoverable arcuate member defining a predetermined degree of curvature, the recovery of which occurs as a change in said degree of curvature.

12. A sensor according to claim 1, wherein said control means maintains said sensor element at a constant temperature within said temperature range.

13. A sensor according to claim 12, wherein said constant temperature lies in a lower sub-range of said temperature range.

14. A sensor according to claim 12, wherein said constant temperature lies in an upper sub-range of said temperature range.

15. A sensor according to claim 12, wherein said temperature range comprises a sub-range in which recovery of said sensor element is maximized, and further wherein said constant temperatures lies in said sub-range.

16. A method of sensing a physical characteristic of a system within a predetermined range of values, said method comprising the following steps:
providing a sensor having a sensor element formed from a deformation heat-recoverable material;
selecting said material such that it has a predetermined range of temperatures in which recovery occurs;
placing said sensor in said system;
controlling said sensor element to be maintained within said predetermined range of temperatures; and
using said sensor element to sense a physical characteristic of said system.

17. A method according to claim 16, wherein the step of controlling said sensor element comprises the following steps:
sensing a variable physical property associated with said sensor element, said physical property varying dependent upon the temperature of said sensor element;
directing a selectively variable flow of electrical energy through said sensor element at levels sufficient to maintain said sensor element at a substantially constant temperature by varying said flow of electrical energy dependent upon variations in said physical property.

18. A method according to claim 17, further comprising the step of generating signals corresponding to said levels of flow of electrical energy.

19. A method according to claim 18, further comprising the step of selecting said constant temperature to be a temperature at which recovery of said deformation heat-recoverable material begins.

20. A method according to claim 18, further comprising the step of selecting said physical property from a group consisting of temperature, density, pressure, thermal condition, gas presence, and number of ambient particles.

* * * * *